United States Patent [19]
Suzuki et al.

[11] 3,971,665
[45] July 27, 1976

[54] REFRACTORY COMPOSITIONS

[75] Inventors: Keiki Suzuki, Onoda; Akitoshi Yoshida; Shigeki Inoue, both of Funabashi, all of Japan

[73] Assignee: Nissan Chemical Industries, Ltd., Tokyo, Japan

[22] Filed: Mar. 18, 1974

[21] Appl. No.: 452,376

[52] U.S. Cl. .................................. 106/58; 106/59; 106/63; 106/69; 106/84
[51] Int. Cl.² ........................................ C04B 35/02
[58] Field of Search ................. 106/84, 69, 58, 59, 106/63

[56] References Cited
UNITED STATES PATENTS

| | | | |
|---|---|---|---|
| 3,625,722 | 12/1971 | Von Freyhold et al. | 106/84 |
| 3,634,286 | 1/1972 | Yates | 106/84 |
| 3,718,491 | 2/1973 | Yates | 106/84 |
| 3,804,650 | 4/1974 | Meissner et al. | 106/84 |
| 3,834,914 | 9/1974 | Neely et al. | 106/84 |

*Primary Examiner*—J. Poer
*Attorney, Agent, or Firm*—Haseltine, Lake & Waters

[57] ABSTRACT

A refractory composition comprises a basic refractory raw material such as oxides or hydroxides of magnesium, calcium, chromium or maganese, quaternary ammonium hydroxide and silica sol and/or silicate. The composition is used to prepare unfired refractories having a high compression strength by merely molding and drying it without the necessity of firing. When fired, it manifests comparable compression strength. The composition can also be used as monolithic refractory, refractory mortar, refractory coating agent, mold release, etc.

9 Claims, No Drawings

REFRACTORY COMPOSITIONS

BACKGROUND OF THE INVENTION

This invention relates to a refractory composition containing a basic refractory material and suitable for preparing refractories.

In the art of steel making, the open hearth process and the bottom-blown converter process have been gradually substituted by the pure oxygen top-blown converter process due to the development of the latter. With an extensive increase in the production quantity of crude steel, the demand for basic refractories has also been increased greatly, with the result that the demand for dolomite clinker and dolomite magnesia clinker which are used as the raw materials for preparing basic refractories in such converter furnaces has also been increased. For this reason, it is a recent trend that acidic refractories are substituted by basic refractories in most cases.

When molding refractories, where the binding force of the raw material refractory substance itself is low, various types of binders are added. Silica sol is an excellent binder. When silica sol is used as a binder it is possible to obtain excellent refractories owing to its strong bonding force manifested by it at the time of hardening and the refractive property of silica. Where a basic refractory raw material, for example magnesia clinker, is mixed with silica sol for molding basic refractories, the silica sol almost instantly gels so that it is difficult to obtain molded products of high mechanical strength. Even when molded under a high pressure and subsequently dried or fired, the mechanical strength of the dried or fired molded products is extrememly low because the bonding force of the silica sol has not been manifested. For this reason, it has been generally recognized that use of silica sol is not effective for the raw material of basic refractories.

Water glass such as potassium-, sodium-, lithium-silicate, etc. has also been used as the binder for basic refractories. However, since water glass contains a large quantity of alkali metals, molded refractories using water glass are difficult to sufficiently dry and have a high tendency toward deliquescence and slaking. Moreover, the refractoriness of such molded articles is low. For this reason, the field of application of the refractories using water glass is limited.

It has been proposed to use guanidine silicate as a silica type binder as disclosed in the specification of Japanese patent publication No. 128 of 1970. However, not only is the supply source of guanidine silicate limited as an industrial material, but also the mechanical strength of basic refractories using this binder is not so high.

Magnesium chloride, tar etc. are also used as the binder for basic refractories, but the mechanical strength after drying of basic refractory raw material using such binders is low so that sufficiently high mechanical strength can not be attained unless the molded articles are fired. Where tar is used, it has been recognized that the mechanical strength decreases unexpectedly when the molded articles are fired at a temperature of about 800°C. Where magnesium cloride is used the molded refractories have a tendency toward deliquescence and slaking.

Accordingly, it will be highly valued to obtain refractories having a high mechanical strength and not manifesting the properties of deliquescence and slaking by using a silica type binder for basic refractory raw materials.

SUMMARY OF THE INVENTION

It is an object of this invention to provide a refractory composition which contains a basic refractory raw material, and which can form refractories having a sufficiently high compression strength by merely molding and drying it and is not required to be fired.

A further object of this invention is to provide a novel refractory composition containing a basic refractory raw material selected from the group consisting of an oxide or hydroxide of magnesium, calcium, chromium or manganese or mixtures thereof, and utilized to form unfired refractories having a high refractoriness and not manifesting the properties of deliquescence and slaking.

The refractory composition of this invention is characterized by comprising a basic refractory raw material, a quaternary ammonium hydroxide expressed by a general formula

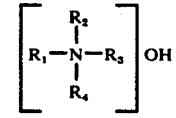

wherein $R_1$, $R_2$, $R_3$ and $R_4$ respectively represent alkyl radicals or hydroxy alkyl radicals having 1 to 4 carbon atoms, and a silica component which is a (1) silica sol utilizing a dispersion medium consisting of water, a hydrophilic organic solvent or a mixture thereof and/or (2) an alkyl or alkali silicate.

The basic refractory raw materials selected from the group consisting of oxides or hydroxides of magnesium, calcium, chromium or manganese are used commercially as basic or neutral refractory raw materials in the form of lumps, granules, fine particles, and fibers.

The oxide or hydroxide of magnesium has been generally used as the gelation agent for silica sol, but in this invention, these materials are not used as gelation agents but used as the essential component for imparting a high mechanical strength to the molded refractories.

The quaternary ammonium hydroxide used to form the composition of this invention is expressed by a general formula

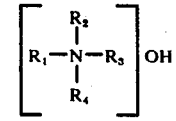

wherein $R_1$, $R_2$, $R_3$ and $R_4$ respectively represent alkyl radicals or hydroxy alkyl radicals having 1 to 4 carbon atoms. The most suitable quaternary ammonium hydroxides include those in which $R_1$ through $R_4$ represent alkyl radicals or hydroxy alkyl radicals having 1 to 3 carbon atoms, for example, methyl, ethyl, propyl, hydroxymethyl, hydroxyethyl, and hydroxypropyl radicals. Accordingly, examples of the cationic groups of the quaternary ammonium hydroxide are $[(C_2H_4OH)_2.N.(CH_3)_2]$, $[(C_2H_4OH)_3.N.CH_3]$ and $[(C_2H_4OH)_4.N]$.

The silica sol utilized to form the composition of this invention means silica sol dispersed in water, or hydrophilic organic solvents or a mixture thereof as the dispersing medium. The preferred silica sol is aqueous silica sol, methanol silica sol, ethanol silica sol, water-methanol silica sol, etc. These silica sols can be prepared from alkali silicate by cation exchange process, or by the degelation of silica gel. There is no limitation of the particle size, pH and the ratio of $SiO_2/Me_2O$ of the silica sol, where Me represents the atom of a monovalent alkali metal.

The silicate utilized to prepare the composition of this invention means alkyl silicate and alkali silicate. The preferred alkyl silicate is ethyl silicate, or ethyl silicate which is partially hydrolyzed and contains silica sol. The alkali metal in the alkali silicate may be lithium, postassium, or sodium.

Silica sol and silicate containing from about 10 to 45% by weight of silica are suitable to prepare the composition of this invention.

In the preparation of the novel composition any order of admixing the respective components may be used except that the silica sol and/or silicate should be admixed with the quaternary ammonium hydroxide before or concurrently with the incorporation of the silica sol and/or silicate into the basic refractory raw material. For example, after incorporation of the quaternary ammonium hydroxide into the basic refractory raw material, the silica sol and/or silicate may be incorporated. Alternatively, the basic refractory raw material may be added to and mixed with a liquid mixture of the quaternary ammonium hydroxide and the silica sol and/or silicate. Where another refractory raw material, auxiliary agent or the like is incorporated as will be described later, they can be incorporated at any stage, provided that said basic order of mixing is followed.

The foregoing description means that the object of this invention can also be attained even when other components are added after the quaternary ammonium hydroxide and silica sol and/or silicate have been mixed together and have been caused to react with each other to form quaternary ammonium silicate. This fact was confirmed by experiments. For this reason, within the scope of this invention is also included a composition containing said basic refractory raw material and quaternary ammonium silicate.

In the composition of this invention prepared by admixing various constituents it is essential that the respective constituents are homogeneously admixed and that the concentrations of the quaternary ammonium hydroxide, silica sol and or silicate, the quantity of water added, etc. should be adjusted such that the resulting composition is a slurry and wet or only slightly wet (nearly dried state), although somewhat different depending upon the application of the composition. When refractories are prepared by molding the composition of this invention, after drying, the molded articles have an extrememly high mechanical strength if the quantity of water is reduced as far as possible.

The preferred ratio of the components necessary to obtain compositions of high mechanical strength is from 0.1 to 200 parts by weight of silica sol and/or silicate in terms of $SiO_2$, per 100 parts by weight of the basic refractory raw material, and is from 0.001 to 4 moles of quaternary ammonium hydroxide per mole of $SiO_2$ contained in the silica sol and/or silicate.

After mixing the components, the composition of this invention retains sufficiently high workability until it is molded. Although after molding the molded article hardens naturally, when the molded article is dried at normal temperature or at a low temperature less than 300°C, its mechanical strength can be greatly improved. The resulting molded article shows an apparent specific gravity of from 1.2 to 3.6 and a compression strength of from 100 to 800 kg/cm$^2$, although these characteristics vary depending upon the nature and grain size distribution of the raw material powder and molding pressure. Even when the molded article is fired at a higher temperature, the cold compression strength does not increase greatly as in conventional refractories but the strength does not increase to any appreciable extent. Thus, the novel composition of this invention is characterized in that it can produce refractories having sufficiently high compression strength by mere low temperature drying. It is to be particularly noted that while the conventional refractory composition incorporated with tar or other organic binders decreases its cold compression strength when the articles manufactured by molding such composition are fired at a temperature of from 600° to 1300°C, the molded articles of the novel composition of this invention do not decrease their strength even when they are fired at such high temperatures.

Basic, neutral or acidic refractories such as brick, monolithic refractories and molded and hardened refractory mortar prepared from the novel commposition of this invention have an excellent characteristic that they always have high mechanical strength when they are dried at normal temperature or then fired at elevated temperature.

In addition to these principal ingredients described above, the composition of this invention can also be incorporated with other refractory raw materials such as powdered silica, alumina, chamotte, silicon carbide, boron nitride, etc.; a viscosity improver, for example, polyacrylic acids or their salts, polyethylene oxides, polyvinyl alcohol, phenol resin, bentonite, magnesium montmorillonite, etc.; a foaming agent; a surface active agent; and an auxiliary binder, for example alumina sol, aluminum biphosphate, basic aluminum halides, basic aluminum organic salt, zirconium oxide, etc. Especially, where a pyrolyzable foaming agent which does not gelate the composition is incorporated into the composition of this invention, it is possible to obtain excellent refractories capable of resisting shrinkage. The use of hydrogen sodium carbonate, ammonium carbonate etc., is not advantageous because they convert the composition into a gel, but azodicarbonamide is a preferred foaming agent.

The composition of this invention can be used to prepare fired or not fired basic refractories such as magnesia bricks, magnesia chromia bricks, etc; light weight magnesia bricks, basic monolithic refractories, inorganic boards; refractory coating materials (mastic coating material) for heavy coating on building walls; refractory coating materials, refractory slurries for shaping casting molds, coating materials for molds, etc. The neutral or acidic refractories incorporated with the basic refractory raw materials described above are one of the important applications of the novel composition of this invention.

DESCRIPTION OF THE PREFERRED EMBODIMENTS

The following examples are given to aid better understanding of this invention, but it should be understood that the invention is by no means limited to these specific examples.

EXAMPLE 1

100 parts by weight of 20 mesh magnesia clinker and 60 parts by weight of 300 mesh magnesia clinker were mixed together in a mixer, and thereafter 10 parts by weight of monomethyl-triethanol ammonium hydroxide and 20 parts by weight of water were added to the mixture. After thoroughly stirring the resulting mixture, 30 parts by weight of aqueous silica sol containing 30% by weight of $SiO_2$ (sold under the trade name of Snowtex 30 by Nissan Chemical Industries, Ltd.) was incorporated and kneaded for about 5 minutes to obtain the composition of this invention which is somewhat wet and powdery. This composition was stamped 20 times in a molding machine for casting sand and the stamped composition was shaped into cylindrical test pieces each having a diameter of 50 mm and a height of 50 mm. After drying the test pieces at room temperature, they were fired for two hours at four different temperatures of 120°C, 300°C, 800°C and 1400°C, respectively.

For comparison, a composition of the present invention wherein the quaternary ammonium hydroxide alone is not incorporated, a composition incorporated with guanidine instead of the quaternary ammonium hydroxide and a composition utilizing sodium silicate containing 30% of $SiO_2$ as the binder and not utilizing quaternary ammonium hydroxide were also tested and the results of the tests are shown in the following Table 1.

than that of the novel composition when it is dried at normal temperature. In contrast, articles utilizing the composition of this invention have sufficiently high strength even when they are dried at normal temperature. Table 1 also shows that when dried at a slightly higher temperature, for example 120°C, they manifest extremely high strength and that even when they are fired at a higher temperature they manifest substantially the same strength.

EXAMPLE 2

4 kg of magnesium clinker (40:60 mixture of 200 mesh pass and 400 mesh pass) was put into a mixer and 2 kg of an aqueous solution of dimethyldiethanol ammonium silicate containing 40% by weight of $SiO_2$ and 10% by weight of dimethyldiethanol ammonium hydroxide, and 5 g of azodicarbonamide (foaming agent) were added to the magnesium clinker while stirring. After kneading for 3 minutes, the resulting mixture was charged into a wooden mold for molding normal bricks as specified by JIS and having an inner volume of 1720 ml. A lid was applied to the mold and the mold was left to stand for one day at room temperature thus hardening the mixture. When released from the wooden mold, the resulting brick resembled an extremely hard concrete brick. When the brick was dried for 45 hours at a temperature of 150°C, an unfired light weight magnesia brick was obtained having an apparent specific gravity of 2.5 and a compression strength of 310 kg/cm$^2$.

An unfired brick prepared by the same process as above described except that the 18 mesh magnesia clinker was substituted by 18 mesh chamotte powder, had an apparent specific gravity of 2.4 and a compression strength of 232 kg/cm$^2$. When the brick was fired at a temperature of 130°C, it did not shrink to any appreciable extent and had a compression strength of 240 kg/cm$^2$.

Table 1

| | Additive to magnesia clinker (parts by weight) | | Comp. Strength (kg/cm$^2$) at 25°C | | | | |
|---|---|---|---|---|---|---|---|
| | quaternary ammonium hydroxide or substituent | binder | Treating temperature | | | | |
| | | | Normal temp. | 120°C | 300°C | 800°C | 1400°C |
| Test piece No.1 | monomethyl triethanol ammonium (10) | silica sol (30) | 125 | 280 | 265 | 225 | 256 |
| No. 2 | tetra-ethanol ammonium (10) | silica sol (30) | 105 | 232 | 228 | 208 | 235 |
| Control No.1 | — | silica sol (30) | 28 | 32 | 41 | 32 | 112 |
| No.2 | guanidine (10) | silica sol (30) | 35 | 50 | 48 | 42 | 85 |
| No.3 | — | sodium silicate (30) | 15 | 122 | 158 | 185 | * |

*Impossible to measure because this control piece has deformed at the time of heat treatment.

As can be noted from Table 1, the prior art compositions shown as control Nos. 1 to 3 have a tendency of increasing the compression strength as the firing temperature increases and the maximum value of their compression strength is at most comparable or less Conventional refractories shrink during drying and firing after they have been molded due to the release of free water, crystallization water and volatile impurities, stabilization of the volume, and the changes of the minerals, etc. It is surprising that the refractory of this example does not shrink and shows a high compression strength. It is presumed that this is caused by a strong bonding force of the binder utilized in the composition of this invention which is sufficient to overcome the shrinking force of the refractory material which is generated during the drying and firing thereof and by the fact that the swelling of the material caused by the foaming of azodicarbonamide compensates for the shrinkage while the bonding force of the binder is not effective or while the composition is still in the plastic state before hardening.

In the fabrication of a furnace, it is possible to fabricate the wall thereof by merely pouring a slurry of this composition in a wooden framework and then hardening the composition like a normal concrete slurry, instead of piling up bricks.

A flat plate prepared by pouring the slurry into a metal mold for manufacturing flat plates and having a dimension of 300 mm × 300 mm × 16 mm, followed by hardening and drying for 24 hours at at temperature of 120°C had properties suitable for use as building material.

EXAMPLE 3

100 parts by weight of 20 mesh pass chamotte powder, 50 parts by weight of a fine powder of agalmatolite and 3 parts by weight of manganese oxide were charged in a ball mill, and then 8 parts by weight of trimethyl monopropyl ammonium hydroxide, 40 parts by weight of water and 5 parts by weight of a powder of precipitated silica were added. The resulting mixture was kneaded for 72 hours to obtain a viscous slurry. During kneading the precipitated silica powder was degelled and converted into a sol which was then caused to react with quaternary ammonium hydroxide to produce quaternary ammonium silicate. 2 parts by weight of a mixture of magnesium oxide and calcium oxide was added to the slurry and then kneaded to obtain a wet powder. This powder has an extremely satisfactory moldability when used as monolithic refractories and when it is stamped and dried at a temperature of from room temperature to 300°C, refractory material having a compression strength higher than 50 kg/cm$^2$ was obtained. It was found that this refractory material has excellent properties suitable for use as joints for bricks in a furnace and runner, repair material. A slurry obtained by diluting this monolithic material with an equal quantity of water before drying and hardening is suitable to be used as a mold releasing agent when forming ingots of iron and non-ferrous metals.

4 parts by weight of an aqueous solution of potassium silicate was added to the composition of this example. The resulting mixture was treated in the same manner as described above. It was found that when the product was fired at a temperature of 600°C to 1100°C its compression strength was increased greatly. In contrast, when trimethyl monopropylalcohol ammonium hydroxide was omitted, the composition had no plasticity and pulverized even when it was stamped. Thus such composition could not be used.

EXAMPLE 4

2 kg of 325 mesh pass fired alumina, 1 kg of 200 mesh pass magnesia powder, 40 g of bentonite, 20 g of polyvinyl alcohol, 2 g of azodicarbonamide and 15 g of expandable styrene beads were mixed together in a mixer. 4 kg of active silica sol containing 3% of SiO$_2$ obtained immediately after dealkalizing sodium silicate by ion exchange process and 80 g of dimethyldiethanol ammonium hydroxide were mixed together and caused to react by heating. The reaction product was concentrated to obtain 400 g of a solution of dimethyl diethanol ammonium silicate containing 30% of SiO$_2$. This solution was added to the mixture in the mixer and the resulting mixture was kneaded to obtain a slurry having a viscosity of 4800 centipoise. The slurry was uniformly poured into a metal mold for casting normal bricks and having a volume of 1720 ml. After applying the lid the mold was heated for one day at a temperature of 120°C thereby causing the slurry to foam and harden.

After being released from the metal mold, the hardened brick was heated for 24 hours at a temperature of 120°C. The resulting brick had an apparent specific gravity of 1.8. This brick had a high compression strength both before and after additional firing carried out at a temperature of 1450°C, as shown in the following Table 2. There is no difference in the strength between portions near the side surface and the central portion of the brick. Thus, the strength of the brick is uniform at all portions.

A control brick was prepared in substantially the same manner except that the magnesia powder was substituted by an equal amount of a 200 mesh pass powder of fired alumina. The apparent specific gravity of the control brick was 1.85 and its compression strength was much smaller than that of the brick utilizing magnesia powder as shown in Table 2.

Table 2

| | Base material | temp. of treatment (°C) | Compression strength (Kg/cm$^2$) | |
|---|---|---|---|---|
| | | | end | cemter |
| Embodiment | fired alumina and | 120 | 80 | 80 |
| | magnesia | 1450 | 125 | 123 |
| Control | fired alumina alone | 120 | 35 | 22 |
| | | 1450 | 82 | 34 |

EXAMPLE 5

Equal quantities of coarse powder of chamotte, zircon flour, a fine powder of magnesia and a fine powder of alumina rich chamotte were mixed together and while mixing 500 g of this mixture in a mixer, 300 g of monomethyl triethanol ammonium silicate containing 35% of SiO$_2$ and 0.5 g of an aqueous solution of sodium polyacrylate were incorporated into the mixer and kneaded, while kneading 40 g of 10% ammonium carbonate solution was added and the mixture was immediately poured into a cavity defined by a rear mold and a model. 15 minutes later, the model was removed and its surface was compelled to be dried by heating it with a burner. However, it was found that the surface of the mold was not coarsened. The mold not heated by the burner but merely left to stand for one day also had no crack.

While the invention has been described in terms of some preferred embodiments it should be understood that the invention is not limited to these specific embodiments.

What is claimed is:

1. A refractory composition by comprising:

a. 100 parts by weight of a basic refractory material selected from the group consisting of oxides and hydroxides of magnesium, calcium, chromium and manganese, and mixtures thereof;
b. from 0.1 to 200 parts by weight of a silica component selected from the group consisting of silica sol and silicate and mixtures thereof in terms of $SiO_2$, said silica sol being dispersed in a solvent selected from the group consisting of water and a hydrophilic organic solvent and mixtures thereof and said silicate being selected from the group consisting of lithium, potassium and sodium silicates, ethyl silicate and partially hydrolyzed ethyl silicate: and
c. from 0.001 to 4 moles of a quaternary ammonium hydroxide per mole of $SiO_2$ contained in said silica component, said quaternary ammonium hydroxide being expressed by the formula

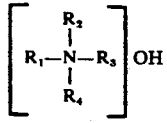

wherein $R_1$, $R_2$, $R_3$ and $R_4$ respectively are selected from the group consisting of alkyl radicals and hydroxyalkyl radicals having 1 to 4 carbon atoms; and by being prepared by admixing the quaternary ammonium hydroxide with the silica component before or concurrently with the incorporation of said silica component into said basic refractory raw material.

2. The refractory composition according to claim 1 wherein said silica component is silica sol dispersed in a solvent selected from the group consisting of water, methanol, ethanol and mixtures thereof in which the concentration of $SiO_2$ amounts to from 10 to 45% by weight.

3. The refractory composition according to claim 2 wherein said basic refractory raw material is magnesia in the form of a powder, granules or lumps.

4. The refractory composition according to claim 2 wherein said basic refractory raw material is a mixture of magnesia and chromia in the form of powders, granules or lumps.

5. The refractory composition according to claim 2, wherein said quaternary ammonium hydroxide is selected from the group consisting of dimethyldiethanol ammonium hydroxide monomethyl-triethanol ammonium hydroxide, and trimethyl monopropyl ammonium hydroxide.

6. The refractory composition according to claim 5 which further comprises a pyrolyzable foaming agent.

7. The refractory composition according to claim 6, wherein said pyrolyzable foaming agent is azodicarbonamide.

8. An unfired refractory article prepared by molding and drying at a temperature of less than 300°C a refractory composition comprising:
a. 100 parts by weight of a basic refractory raw material selected from the group consisting of oxides and hydroxides of magnesium, calcium, chromium and manganese, and mixtures thereof;
b. from 0.1 to 200 parts by weight of a silica component selected from the group consisting of silica sol and silicate in terms of $SiO_2$, said silica sol dispersed in a solvent selected from the group consisting of water, methanol, ethanol and mixtures thereof in which the concentration of $SiO_2$ amounts to from 10 to 45% by weight; and
c. from 0.001 to 4 moles of quaternary ammonium hydroxide per mole of $SiO_2$ contained in said silica component, said quaternary ammonium hydroxide having the formula

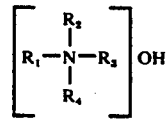

wherein $R_1$, $R_2$, $R_3$ and $R_4$ respectively are selected from the group consisting of alkyl radicals and hydroxyalkyl radicals having 1 to 4 carbon atoms; and prepared by admixing the quaternary ammonium hydroxide with said silica component before or concurrently with the incorporation of the said silica component into said basic refractory raw material.

9. A refractory article prepared by firing the unfired refractory article according to claim 8.

* * * * *